(12) United States Patent
Lehmann et al.

(10) Patent No.: US 6,821,226 B2
(45) Date of Patent: Nov. 23, 2004

(54) METHOD FOR CONTROLLING THE SHIFTING SEQUENCE OF A CONTINUOUS AUTOMATIC TRANSMISSION, ESPECIALLY A MOTOR VEHICLE, COMPRISING GEAR STEP CHANGEOVERS

(75) Inventors: Ralf Lehmann, Stuttgart (DE); Uwe Maienberg, Leonberg (DE); Marko Poliansek, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,556
(22) PCT Filed: Sep. 8, 2001
(86) PCT No.: PCT/DE01/03453

§ 371 (c)(1),
(2), (4) Date: Oct. 16, 2002

(87) PCT Pub. No.: WO02/35120

PCT Pub. Date: May 2, 2002

(65) Prior Publication Data

US 2003/0078128 A1 Apr. 24, 2003

(30) Foreign Application Priority Data

Oct. 25, 2000 (DE) .......... 100 52 795

(51) Int. Cl.[7] .............. F16H 47/04
(52) U.S. Cl. .......... 475/80; 475/72; 475/76
(58) Field of Search .......... 701/51, 62; 192/219.1; 475/80, 72, 76, 83, 84

(56) References Cited

FOREIGN PATENT DOCUMENTS

| GB | 2 177 765 | 1/1987 |
|----|-----------|--------|
| WO | WO 00 43695 | 7/2000 |

*Primary Examiner*—Charles A. Marmor
*Assistant Examiner*—Dennis J. Abdelnour
(74) *Attorney, Agent, or Firm*—Walter Ottesen

(57) ABSTRACT

The method serves for the shift sequence control of a continuous automatic transmission, especially of a motor vehicle, having gear-stage switchover. The transmission ratio of the automatic transmission is adjustable within a set gear stage by means of an adjusting unit. Here, it is provided that a coordinated, data-dependent control of the gear stage switchover and the continuous transmission ratio adjustment takes place with the aid of a common shift sequence control system.

4 Claims, 2 Drawing Sheets

METHOD FOR CONTROLLING THE SHIFTING SEQUENCE OF A CONTINUOUS AUTOMATIC TRANSMISSION, ESPECIALLY A MOTOR VEHICLE, COMPRISING GEAR STEP CHANGEOVERS

FIELD OF THE INVENTION

The invention relates to a method for the shift sequence control of a continuously variable automatic transmission, especially of a motor vehicle, having gear-stage switchover. The transmission ratio of the automatic transmission is continuously adjustable within a set gear stage by means of an adjusting unit.

BACKGROUND OF THE INVENTION

Continuous automatic transmissions having gear-stage switchover are already known under the designation "CVT-transmission". This relates to combination transmissions for motor vehicles which have a stepped automatic (planetary sets) and a continuously adjustable unit for continuously adjusting the transmission ratio within a particular adjusted gear stage (range).

The known methods for shift sequence control are unfortunately not suited to ensure a satisfactory adjustment of the transmission ratio on such a combination transmission (CVT-transmission having range switchover).

SUMMARY OF THE INVENTION

The method of the invention is characterized in that a coordinated, data-dependent control of the gear stage switchover and the continuous transmission ratio adjustment takes place by means of a common shift sequence control system. The control of the gear-stage switchover as well as of the continuous transmission ratio adjustment is coordinated within an adjusted gear stage (range) by means of a common shift sequence control system. For this reason, it is possible to achieve adjustment actions of a transmission ratio on a continuously variable automatic transmission flexibly by means of suitable data changes. A coordinated, data-dependent control of this kind thereby permits a correct shift or adjustment of a transmission ratio on a corresponding continuous automatic transmission. This shift or adjustment of a transmission ratio is satisfactory with respect to the operation of a vehicle. A corresponding control by means of a higher-ranking shift sequence control system can be realized in a relatively simple manner while applying a suitable control program (software).

An initialization of the adjusting unit, which is configured especially as a hydrostatic unit, takes place with advantage. Here, the subject matter is a hydraulic continuously variable transmission. By initializing the adjusting unit, it is possible, in the context of a zero-point adaptation, to compensate possibly present tolerances and/or position discrepancies of components operatively connected to the adjusting unit. This ensures a precise continuous adjustment of a transmission ratio on a continuously variable transmission by means of the adjusting unit.

Advantageously, the initialization takes place in the form of a particular zero-point adaptation of the adjusting unit with reference to a forward travel and/or rearward travel of the vehicle. The adjusting unit has an operating position starting with which a reverse travel of the vehicle is possible, even though the planetary sets are configured for a forward travel. Here, one must distinguish between two separate, specific operating positions of the adjusting unit, namely, a first operating position starting with which a rearward travel of the motor vehicle is possible but not wanted and a second operating position, wherein a forward travel of the vehicle is possible and wanted. These two operating positions of the adjusting unit can shift because of deterioration of the adjusting unit and/or because of deterioration of components operatively connected to the adjusting unit. In this way, inaccuracies are compensated by means of the particular zero-point adaptation of the adjusting unit with respect to a forward travel and rearward travel of the motor vehicle in a reliable manner. These inaccuracies are unwanted and go back to the particular positioning of the adjusting unit.

According to a preferred embodiment, the initialization takes place before a particular taking into service of the motor vehicle. Because of the limited time span available for carrying out a correct initialization, a relatively rapidly and precisely acting control is required, which can be ensured with the use of a higher-ranking shift sequence control system for the coordinated and data-dependent control of the gear stage switchover and of the continuous transmission ratio adjustment.

With advantage, the adjusting unit is adjusted by means of a step motor for the continuous adjustment of the transmission ratio. The step motor is operatively connected to the shift sequence control system. A step motor can be controlled in a relatively simple manner and is suited especially for the displacement of the adjusting unit provided for the continuously changeable transmission ratio and configured especially as a hydrostatic unit. If present, occurring discrepancies between a particular step motor position and a corresponding operating position of the adjusting unit (hydrostatic unit) can be compensated by means of the above-mentioned initialization of the adjusting unit. Likewise, and in the same manner, discrepancies between the desired and actual positions of the step motor can be compensated. These discrepancies are, for example, caused by electronic tolerances, fluctuations in a hydraulic pressure system or the like. Since the drive of the step motor is integrated especially during a gear stage switchover in a phase control of the shift sequence control, it is possible to trigger a step motor action in each shifting phase.

Advantageously, the shift sequence control system determines an assumption of a defined shift position of the adjusting unit in advance of enabling a gear stage switchover. In this way, it is ensured that the adjusting unit is, during a gear stage switchover (range change), in a defined shift position in which synchronism for the adjustment of gears in the automatic transmission is present. These gears are represented by corresponding planetary sets.

In accordance with a preferred embodiment, a position control of the adjusting unit takes place in the context of the continuous transmission ratio adjustment. By means of a position control of this kind, it is advantageously possible to compensate possibly present discrepancies between a particular input value for a step motor position, which is to be adjusted, and a corresponding position of the adjusting unit (hydrostatic unit). A model of characteristic values or characteristic fields or of mechanical or hydraulic basic information can be applied in the context of a position control to compensate for unwanted transmission ratio deviations.

Preferably, for position control, the following adjusting parameters are applied:

corrective step number per computation step;

output frequency of the corrective steps in a defined time span.

In this way, the transmission ratio can be influenced favorably with respect to operation by means of the position control.

Further advantageous embodiments of the invention are evident from the description.

BRIEF DESCRIPTION OF THE DRAWINGS

The invention will now be explained with reference to the drawings wherein.

DESCRIPTION OF THE PREFERRED EMBODIMENTS OF THE INVENTION

The method serves for the shift sequence control of a hydraulic automatic transmission, especially of a motor vehicle having gear stage switchover. The transmission ratio of the automatic transmission is continuously adjustable by means of an adjusting unit within a set gear stage (range). Here, it is provided that a coordinated, data-dependent control of the gear-stage switchover and the continuous transmission ratio adjustment takes place by means of a common shift sequence control system. The shift sequence control system fulfills the following three main tasks:

initialization of the adjusting unit;

adjustment of the transmission ratio within a gear stage (range);

ensure a correct assumption of a defined shift position of the adjusting unit for a gear-stage switchover (change of range or shifting).

Figure 1:
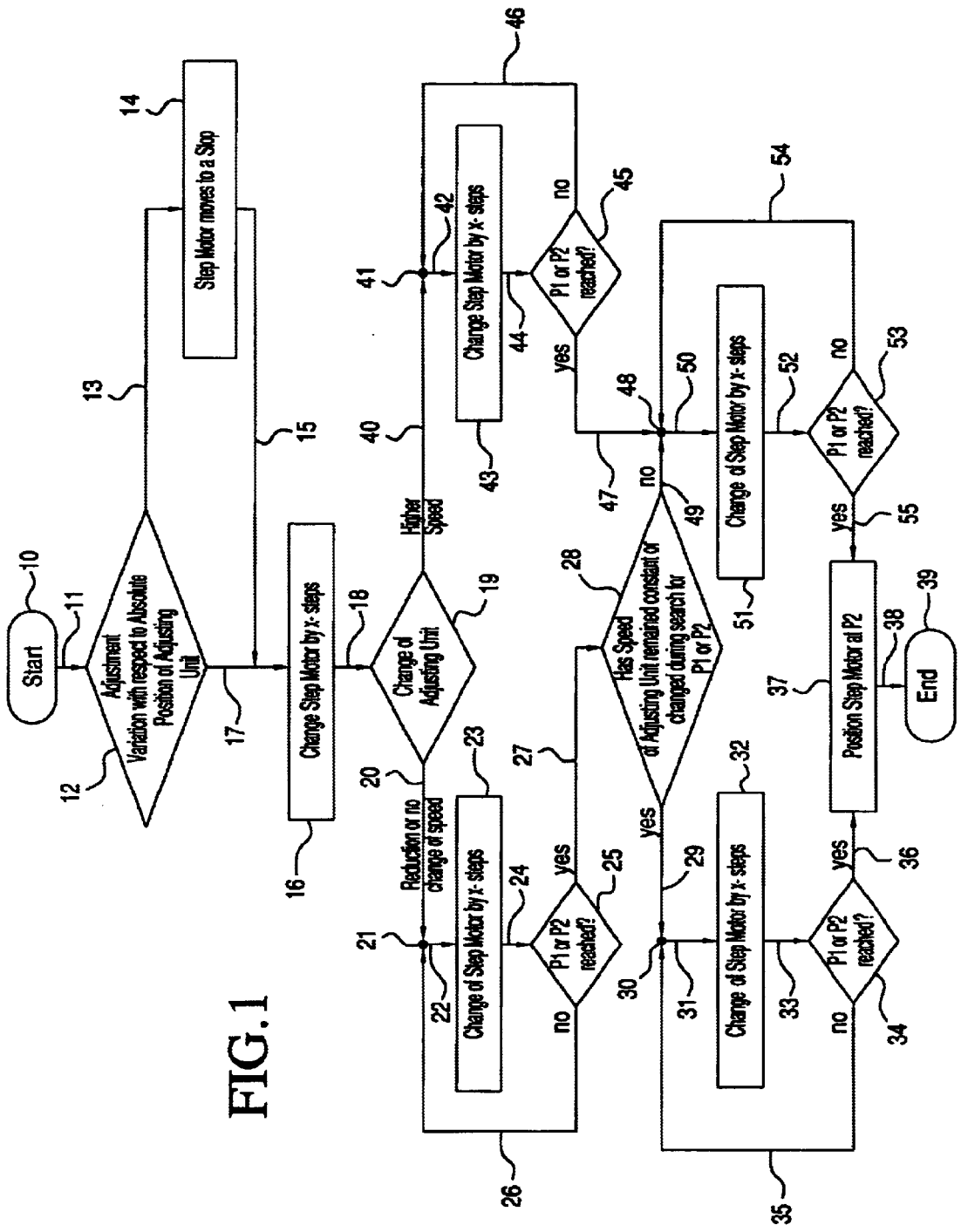
FIG. 1 shows a sequence diagram of an initialization of an adjusting unit of a continuously variable automatic transmission; and, FIG. 2 is a sequence diagram of adjusting or inputting a transmission ratio within a gear stage.

FIG. 1 shows a possible embodiment of an initialization of the adjusting unit in the form of a flowchart. A sequence start (start) is identified by 10 and is connected to a branching 12 by means of a flow line 11. By means of the branching, the question is posed in the context of an application adjustment variation as to whether reference should be made to an absolute position of the adjusting unit. The adjusting unit can be configured as a hydrostatic unit, which is operatively connected to a controllable step motor for the continuous adjustment of the transmission ratio of the automatic transmission. For the case that no reference to an absolute position of the adjusting unit should be taken, then a flow line 17 leads from the branching 12 to an operating unit 16 by means of which a change of the step motor is initiated by X-steps. In the event that reference is to be made to an absolute position of the adjusting unit, a flow line 13 leads from the branching 12 to an operating unit 14 which triggers a travel of the step motor to a stop, for example, to a lower stop. After completed positioning of the step motor, a flow line 15 leads from the operating unit 14 back to the flow line 17 and finally to the operating unit 16, which is connected by means of a flow line 18 to a branching 19. The branching 19 permits an inquiry with respect to a displacement of the hydrostatic unit (adjusting unit), that is, whether the adjustment leads to a higher speed of the hydrostatic unit (flow line 40) or to a reducing or to no change of the speed of the hydrostatic unit (flow line 20). The speed of the hydrostatic unit is determined, for example, by means of a sensor or by computation from other measured speeds.

In the case of a reducing (or not taking place) change of the speed of the hydrostatic unit, a flow line 22 leads to an operating unit 23, which initiates a change of the step motor by X-steps. The flow line 22 is connected by means of a transition position 21 to the flow line 20. A flow line 24 leads from the operating unit 23 to a branching 25 by means of which an inquiry is made as to whether a defined point P1 (operating position of the adjusting unit, starting from which a rearward travel of the motor vehicle is possible) or a defined point P2 (operating position of the adjusting unit, starting from which a forward travel of the motor vehicle is possible) is reached. Should this not apply, a flow line 26 leads from a branching 25 back to the transition position 21. When the hydrostatic unit reaches the point P1 or P2, a flow line 27 leads, in contrast, from the branching 25 to a branching 28 by means of which an inquiry is made as to whether the speed of the hydrostatic unit (adjusting unit) has remained constant or whether a change of this speed took place during the search for points P1 or P2. In the case of a speed change of the hydrostatic unit, a flow line 29 leads from the branching 28 to a transition position 30 from which a flow line 31 leads to an operating unit 32 which initiates a change of the step motor by X-steps. For the case that no change of the speed of the hydrostatic unit took place, a flow line 49 leads to a transition position 48, which will be explained in greater detail hereinafter. From the operating unit 32, a flow line 33 leads to a branching 34 by means of which an inquiry takes place as to whether the step motor has reached the not-yet determined point P1 or P2. If the sought-for point has not been reached, a flow line 35 leads back to the transition position 30. When the sought-for point P1 or P2 has been reached, a flow line 36 leads to an operating unit 37 by means of which a positioning of the step motor to the point P2 is initiated. A flow line 38, which starts from the operating unit 37, leads to the sequence end 39 of the flowchart.

For the case that, according to the branching 19, an increased speed of the hydrostatic unit (adjusting unit) was determined, the flow line 40 leads to a transition position 41, from which a flow line 42 leads to an operating unit 43, which initiates a change of the step motor by X-steps, that is, the displacement direction of the hydrostatic unit is reversed (adjusting direction reversed). The operating unit 43 is connected by means of a flow line 44 to a branching 45 by means of which an inquiry is made as to whether the hydrostatic unit has reached the point P1 or P2. For the case that none of these points has been set, a flow line 46 flows back to the transition position 41. If, in contrast, the hydrostatic unit has assumed one of these points, a flow line 47 leads to transition position 48 to which the flow line 49 simultaneously leads from the branching 28. The transition position 48 is connected by a flow line 50 to an operating unit 51 by means of which a change of the step motor is initiated by X-steps, that is, if the operating unit is reached via the flow lines 47 and 50, then the displacement direction of the hydrostatic unit is retained. If the operating unit 51 is, however, reached via the flow lines (49, 50), then a reversal of the displacement direction of the hydrostatic unit takes place. The operating unit 51 is connected by means of a flow line 52 to a branching 53, which permits an inquiry as to whether the step motor has reached, the point P1 or P2. If the sought-for point has not been reached, a flow line 54 leads from the branching 53 back to the transition position 48. In the event that the sougth-for point has been set, a flow line 55 leads from the branching 53 to the operating unit 37 which, as mentioned above, initiates a positioning of the step motor to P2 and, by means of flow lines 38, is connected to the sequence end 39 of the flowchart.

For the case that reference is to be made to an absolute position of the adjusting unit (hydrostatic unit), the following sequence chain of the flowchart is run through: sequence start 10, flow line 11, branching 12, flow line 13, operating unit 14, flow line 15, flow line 17, operating unit 16, flow line 18, branching 19, flow line 20, transition position 21, flow line 22, operating unit 23, flow line 24, branching 25, flow line 26 or flow line 27, branching 28, flow line 29, transition position 30, flow line 31, operating unit 32, flow line 33, branching 34, flow line 35 or flow line 36, operating unit 37, flow line 38, sequence end 39.

Figure 2:
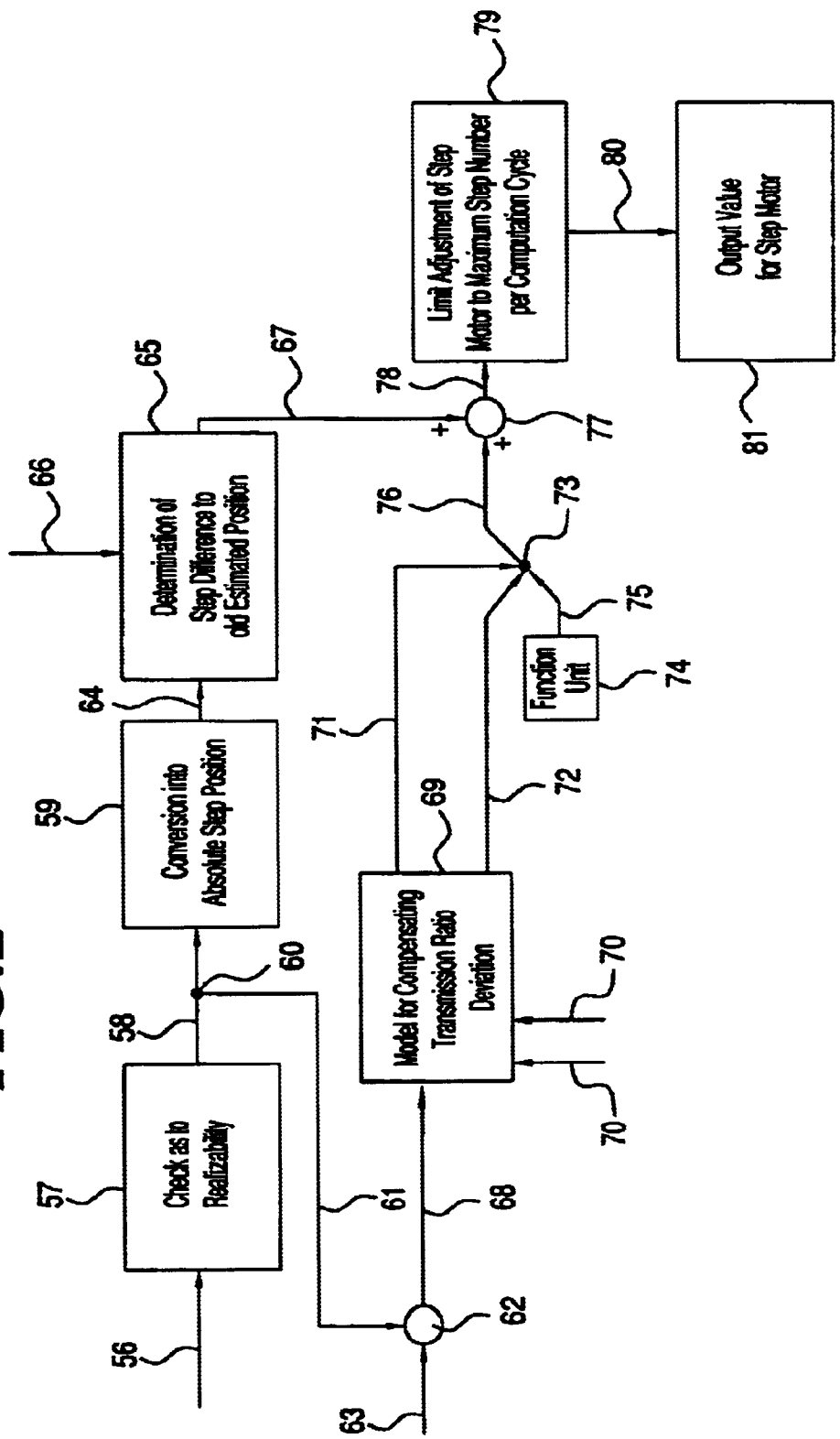

FIG. 2 shows a flowchart for the continuous adjustment of a transmission ratio within a gear stage (range) of the automatic transmission. A transmission ratio suggestion is transmitted to the operating unit 57 via a flow line 56. The operating unit 57 carries out a check of the above-mentioned suggestion as to its realizability. A flow line 58 leads from the operating unit 57 to an operating unit 59 by means of which a conversion of the input data into an absolute step position of the step motor takes place. A flow line 61 leads from a transition position 60 provided on the flow line 58 to a further transition position 62 which is described in detail hereinafter. The operating unit 59 is connected by means of a flow line 64 to an operating unit 65 which serves for the determination of a step difference to an old estimated step position of the step motor. For this purpose, information with respect to an old estimated step position of the step motor is given via a flow line 66 to an operating unit 65. The operating unit 65 is connected additively to a transition position 77 via a flow line 67. A flow line 78 leads from transition position 77 to an operating unit 79, which serves to limit the adjustment of the step motor to a maximum step number per computation cycle. A flow line 80 leads from operating unit 79 to an operating unit 81, which supplies an output value for the adjustment of the step motor.

A further input quantity (actual value of the transmission ratio) is subtractively transmitted via a flow line 63 to the above-mentioned transition position 62, from where a flow line 68 leads to an operating unit 69, which serves for a model-like compensation of a transmission ratio deviation possibly present. A plurality of flow lines 70 lead to the operating unit 69. By means of flow lines 70, data, for example with respect to the particular output rpm present, oil temperature or the like are given to the operating unit 69. From operating unit 69, a flow line 71 with the information "output frequency of the corrective steps in a defined time duration" and a flow line 72 with information "corrective step number per computation step" lead to a switch 73. The switch 73 is clocked with the output frequency of the corrective steps. This means that, alternately, the value "corrective step number per computation step" and a value of a function unit 74, which is connected via the flow line 75 to the switch 73, are supplied via the flow line 76 to the transition position 77, while forming an additive logic operation. Thereafter, and as mentioned above, by means of the operating unit 79, a limiting takes place to maximum steps per computation cycle as well as the output of a corresponding adjusting value for the step motor by means of the operating unit 81.

The operating units 57, 59 and 65 of the sequence diagram of FIG. 2 together with the corresponding flow lines conjointly form a precontrol, while the operating unit 69 forms part of a position control. The position control functions to compensate possibly present discrepancies between an input value for a step motor position, on the one hand, and an operation position of the hydrostatic unit (adjusting unit), on the other hand.

Advantageously, in each shift position of the automatic transmission, a step motor action for the continuous transmission ratio adjustment of the transmission can be triggered by a shift sequence control system.

What is claimed is:

1. A method for shift sequence control of a continuous automatic transmission of a motor vehicle, the transmission having gear-stage switchover with the transmission ratio of the automatic transmission being continuously adjustable within an adjusted gear stage via a hydrostatic adjusting unit and a coordinated, data-dependent control of the gear-stage switchover and of the continuous transmission ratio adjustment takes place via a common shift sequence control system, the method comprising the steps of:

adjusting said hydrostatic adjusting unit utilizing a step motor operatively connected to said common shift sequence control;

detecting values for the speed of said hydrostatic adjusting unit in dependence upon the position of said step motor;

in advance of said motor vehicle starting to travel away from standstill, initializing said hydrostatic adjusting unit by adjusting said step motor and, from said values, determining a specific operating position (P2) of said hydrostatic adjusting unit starting from which operating position (P2) a forward travel of said motor vehicle is possible; and, at the end of the initialization, adjusting said step motor so that said hydrostatic adjusting unit is in said specific operating position (P2) so as to avoid an unwanted rearward travel of said motor vehicle after the starting-to-travel of said motor vehicle.

2. The method of claim 1, wherein said common shift sequence control system determines the assumption of a defined shift position of said hydrostatic adjusting unit in advance of enabling a gear-stage switchover.

3. The method of claim 1, wherein a position control of said hydrostatic adjusting unit takes place in the context of a continuous transmission ratio adjustment.

4. The method of claim 1, wherein the following adjusting parameters are applied for a position control of said step motor: corrective step number per computation step; and, output frequency of the corrective steps in a defined time span.

* * * * *

UNITED STATES PATENT AND TRADEMARK OFFICE
CERTIFICATE OF CORRECTION

PATENT NO. : 6,821,226 B2 Page 1 of 1
DATED : November 23, 2004
INVENTOR(S) : Ralf Lehmann, Uwe Maienberg and Marko Poljansek It is certified that error appears in the above-identified patent and that said Letters Patent is hereby corrected as shown below:

Title page,
Item [56], References Cited, U.S. PATENT DOCUMENTS,
-- 5,522,775 * 06/1996 Maruyama et al .......... 475/76
   5,540,051 * 07/1996 Maruyama et al .......... 475/80
   5,622,050 * 04/1997 Ishino et al ............... 475/80
   5,667,452 * 09/1997 Coutant ................... 475/80
   5,671,137 * 09/1997 Ishino et al ............... 475/80
   5,682,315 * 10/1997 Coutant et al ............. 475/76
   5,931,758 * 08/1999 Walter ..................... 475/72
   6,393,945 * 05/2002 Kuras ..................... 475/80 -- should be added.

Signed and Sealed this

Twenty-second Day of February, 2005

JON W. DUDAS
*Director of the United States Patent and Trademark Office*